Aug. 24, 1943.  C. DE LANGE ET AL  2,327,511
BLOCKING LAYER CELL
Filed July 2, 1941
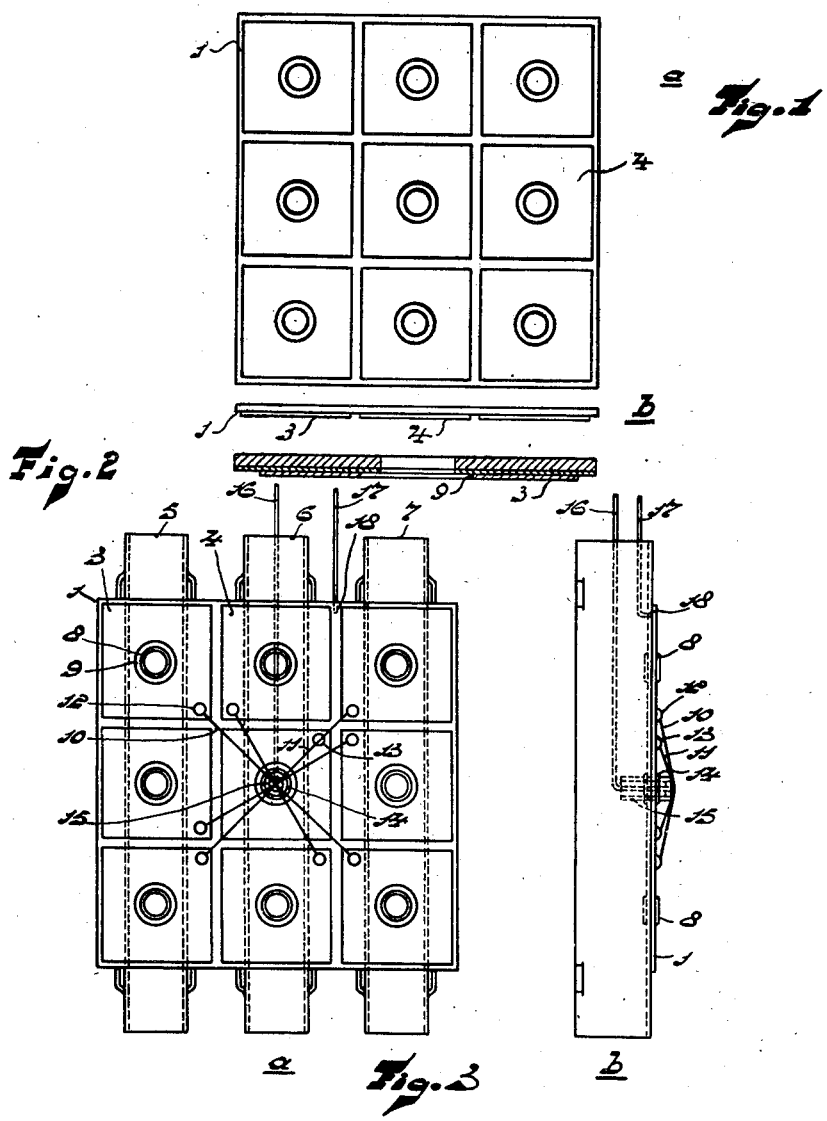
INVENTORS
C. de Lange and
C. L. Boucher
BY
E. F. Wenderoth
ATTORNEY Patented Aug. 24, 1943

2,327,511

UNITED STATES PATENT OFFICE 2,327,511

BLOCKING LAYER CELL

Cornelis de Lange and Charles Louis Boucher, Eindhoven, Netherlands; vested in the Alien Property Custodian Application July 2, 1941, Serial No. 400,853
In the Netherlands July 3, 1940

4 Claims. (Cl. 175—366)

This invention relates to a blocking layer cell, more particularly a blocking layer rectifier, in which a number of rectifying cells are separately juxtaposed on a supporting plate. Blocking layer cells, such as blocking layer rectifiers, have been made from cells formed on a single supporting plate which is provided with grooves and is subsequently broken at the groove portions to obtain a number of smaller rectifiers.

The invention has for its purpose to make use of a rectifier plate comprising separately juxtaposed rectifying cells.

According to the invention each of the corresponding electrodes of the separately juxtaposed rectifying cells is furnished with a separate supply conductor, the common electrical connection between these supply conductors being made at such a distance from the contact point with the electrodes that the free connecting piece can be designed as a switching element in the assembly. As a consequence of this construction the connecting leads for the separated electrodes are given a separate electrical destination in the switching system.

In a suitable embodiment the resistance and the material of the connecting wires are so chosen, that the connecting pieces act as a fuse for each individual rectifying cell.

It occurs in practice that a short circuit ensues between the electrodes at a single point of the rectifier, for instance, on the surface of a fairly large supporting plate. Thereby the whole rectifier plate is rendered unserviceable and as a rule a rectifying unit entirely composed of a plurality of such plates will even have to be put out of service. By subdividing, according to the invention, the plate into a number of individual rectifying cells and utilising the connecting wire for each of these cells as a fuse it is achieved that upon overloading one of these cells, for instance owing to puncture of the blocking layer occurring therein, the connecting wire leading thereto fuses so that only a part of the whole plate fails. In this way the life of the whole rectifier is materially increased. Since the protection against failure of the whole rectifier is better the whole rectifier may be made cheaper; in fact, higher loads can be admitted, in other words less reserve has to be incorporated in the rectifier.

In another form of construction the resistance of the connecting pieces in conjunction with the internal resistance of the corresponding blocking layer cell is so chosen that the total voltage loss for each system consisting of a blocking layer cell and a connecting piece increases with an increasing load.

In the manufacture of rectifier plates, especially of those having a large size, the internal resistance is unavoidably different at various points of the surface of the rectifier plate. By subdividing the rectifying cell extending throughout the surface of the plate into several cells these internal resistances can be matched by means of the connecting wire. The resistance of each cell decreases with an increasing temperature, as a result of which the current strength increases if the applied voltage remains the same. In regard to parallel-connected cells this involves the risk that it is just the cells having a slightly smaller resistance, which consequently absorb a little more current, which first become hotter, due to which the resistance further decreases and there may ensue a very uneven load followed by overloading and destruction of individual cells. This is prevented by utilising the connecting wire as a series-resistance having such a value that the total voltage loss across resistance and blocking layer cell increases with an increasing current load.

In the drawing Figures 1a and b are a front view and a side view respectively of a subdivided rectifying cell.

Fig. 2 is a section through a part of the rectifying cell on an enlarged scale.

Figures 3a and b are a front view and a side view respectively of the connecting wires for the individual rectifying cells.

The rectifier is mounted on an iron supporting plate 1. The exaggerated detail in Fig. 2 shows a selenium layer 2 applied throughout the surface of this supporting plate. This selenium layer carries the counter-electrodes 3, 4 and so on of the individual rectifying cells. These counter-electrodes consist of an alloy of tin, bismuth and cadmium, which melts at about 100° and by means of a templet are so sprayed on the selenium-electrode as to form nine separate rectifiers, as clearly appears from Figures 1b and 3a. Between the counter-electrode and the selenium electrode is located the blocking layer which is not represented separately and may be formed by means of any of the various methods known from literature.

Figures 3a and b represent the rectifier plate with cooling plates 5, 6 and 7 which are secured thereto and have the form of U-beams. The cooling plates are rigidly secured to the rectifier plate by means of flanged bushes engaging corresponding apertures of rectifier plate and cooling plate. Such a flanged bush is designated 8 in Figures 3a and b, for instance. In order to avoid a short circuit between the supporting plate and the counter-electrode the templet referred to above is at the same time so designed as to leave clear a surface area around the aperture 8 and limited by the circle 9 of the material of the counter electrode. In this way each cooling plate 5, 6 and 7 is connected to three separate rectifying cells.

Figures 3a and b exhibit, moreover, the connecting wires for the rectifying cells, two of which may be designated by 10 and 11. At 12 and 13 respectively these connecting wires are connected to the rectifying cells in a manner similar to the other connecting wires. These connecting wires are designed as fuses or as steadying resistances, such as set forth in the preamble of the specification, and these two functions may also be combined. In the drawing the connecting wires are indicated by straight lines, but it will be appreciated that these wires, especially those being at a shorter distance from the central point, will be slightly curved so as to give them a convenient length.

As appears from the drawing a flanged bush 14 of the central rectifying cell is used at the same time for the passage of the connecting wires, which in the present case have already been brought into contact with each other. For this passage the flanged bush 14 is furnished with an insulating bush 15. The common connecting wire 16 is led out at the top, and a second connecting wire 17 is connected at 18 to the supporting plate 1 and consequently to the selenium electrode.

From the foregoing it will appear that the rectifier assembly is protected against the failure of one or more of the rectifier cells. More particularly, failure of the cell 3 causes the connecting wire 10 to be disrupted thereby isolating the cell from the remaining cells and permitting continued operation of the rectifier assembly.

The connecting wire 16 or 17 or both of them may in their turn be designed as steadying resistances in a rectifying unit composed of a plurality of rectifier plates, if such plates are connected in parallel.

What we claim is:

1. A blocking-layer cell assembly comprising a supporting plate, a plurality of blocking-layer cells carried by said plate and each including an electrode, means connecting said cells in parallel, said means comprising a plurality of individual supply conductors each having one end connected to one of said electrodes, the other ends of the conductors being connected together, said conductors forming individual switching elements in said assembly.

2. A blocking-layer cell assembly comprising a supporting base, a plurality of blocking-layer cells carried by said plate and each including an electrode, means to control the current in each of said cells, said means comprising a plurality of individual resistance wire supply conductors each having one end connected to one of said electrodes, the other ends of the conductors being connected together.

3. A blocking-layer cell assembly comprising a supporting plate, a plurality of blocking-layer cells carried by said plate and each including an electrode, and a plurality of individual supply conductors of a heat fusible electrical resistance material, each of said conductors having one end connected to one of said electrodes, the other ends of the conductors being connected together.

4. A blocking-layer cell assembly comprising a supporting base, a plurality of blocking-layer cells carried by said plate and each including an electrode, means to control the current in each of said cells, said means comprising a plurality of individual supply conductors each having one end connected to one of said electrodes, the other ends of the conductors being connected together, each of said conductors comprising a resistance wire element having a resistance value at which the total voltage loss across each cell and its associated conductor increases with increasing currents through the cell.

CORNELIS DE LANGE.
CHARLES LOUIS BOUCHER.